No. 742,586. PATENTED OCT. 27, 1903.
H. B. CARLTON & C. E. HUTCHINGS.
FISHING REEL.
APPLICATION FILED MAR. 7, 1903.
NO MODEL. 3 SHEETS—SHEET 1.

Witnesses:
C. D. Kesler
James L. Norris, Jr.

Inventors
Harvey B. Carlton
Charles E. Hutchings
By James L. Norris
Atty.

No. 742,586. PATENTED OCT. 27, 1903.
H. B. CARLTON & C. E. HUTCHINGS.
FISHING REEL.
APPLICATION FILED MAR. 7, 1903.
NO MODEL. 3 SHEETS—SHEET 2.

Witnesses
C. I. Kesler
James L. Norris, Jr.

Inventors
Harvey B. Carlton
Charles E. Hutchings
By James L. Norris
Atty.

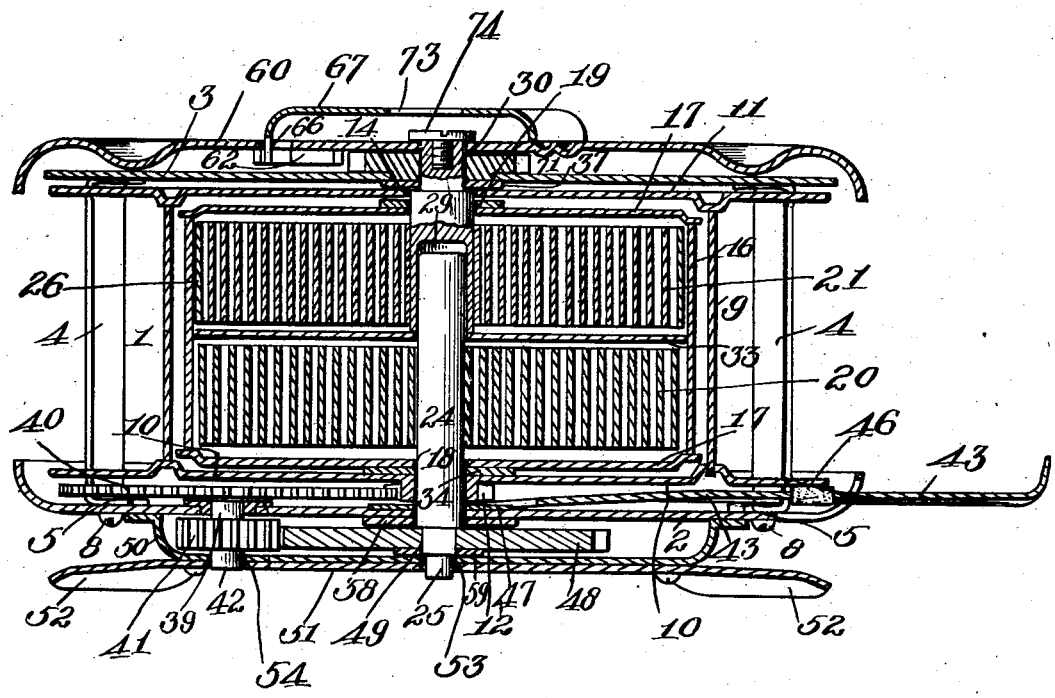

No. 742,586.                                          Patented October 27, 1903.

UNITED STATES PATENT OFFICE.

HARVEY B. CARLTON AND CHARLES E. HUTCHINGS, OF ROCHESTER, NEW YORK, ASSIGNORS TO CARLTON MANUFACTURING COMPANY, OF ROCHESTER, NEW YORK, A CORPORATION OF NEW YORK.

FISHING-REEL.

SPECIFICATION forming part of Letters Patent No. 742,586, dated October 27, 1903.

Application filed March 7, 1903. Serial No. 146,735. (No model.)

*To all whom it may concern:*

Be it known that we, HARVEY B. CARLTON and CHARLES E. HUTCHINGS, citizens of the United States, residing at Rochester, in the county of Monroe and State of New York, have invented new and useful Improvements in Fishing-Reels, of which the following is a specification.

Our invention has for its object to provide an improved construction of spring-barrel involving a novel arrangement of operating-springs therein, to provide a novel arrangement of gearing coöperating with said barrel, and to provide, in connection with a winding-disk for the reel, novel means for disengaging the disk from operative connection with the spring-barrel, whereby to permit the reel to revolve freely independently of the action of the spring.

In addition to the above other objects of the invention relate to details of construction and to combination and arrangement of parts whereby we aim to produce a reel at once simple and durable in construction, reliable in operation, and economical to manufacture.

In order that our invention may be clearly understood, we have illustrated the same in the accompanying drawings, in which—

Figure 1:
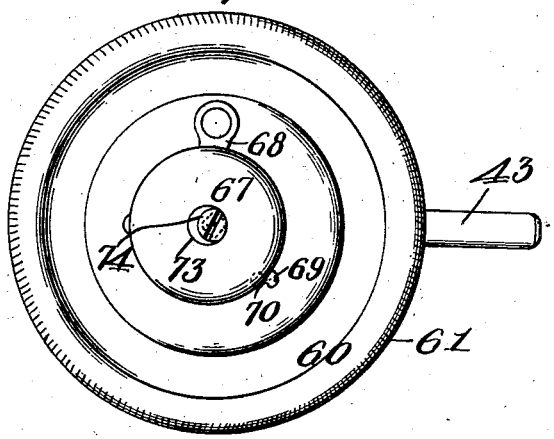
Figure 2:
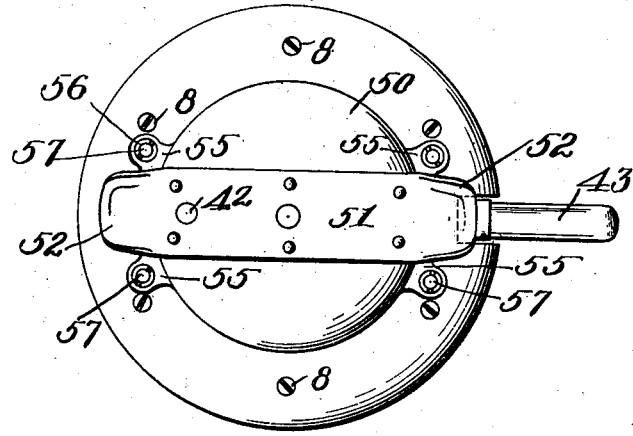
Figure 3:
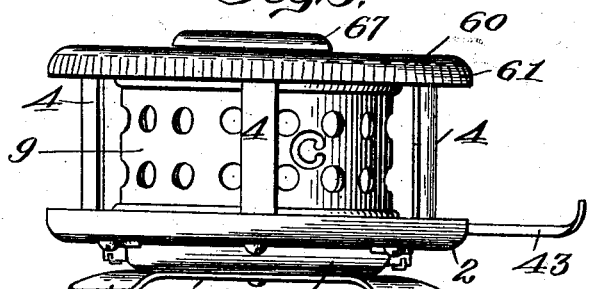
Figure 4:
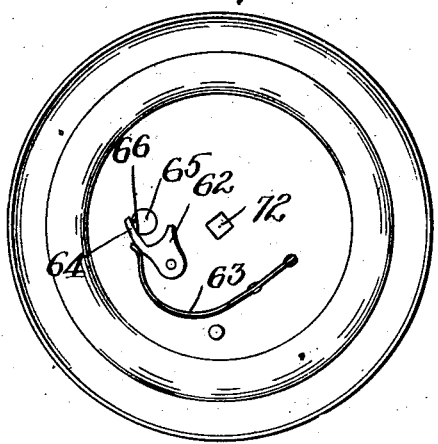
Figure 5:
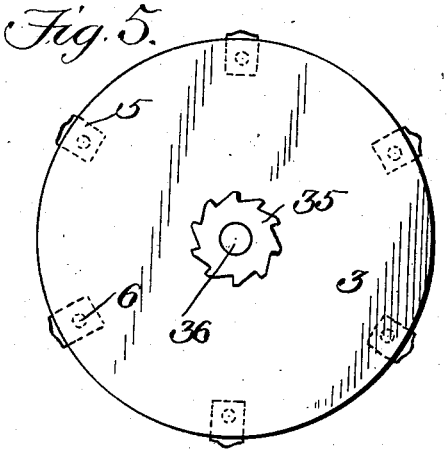
Figure 6:
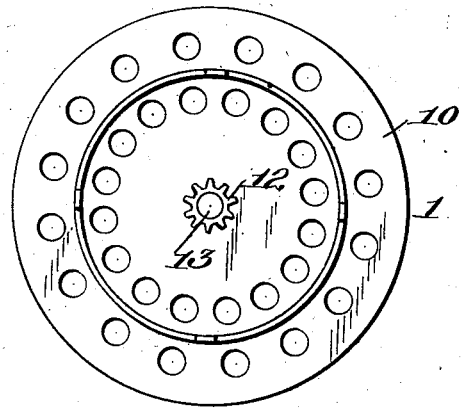
Figure 8:
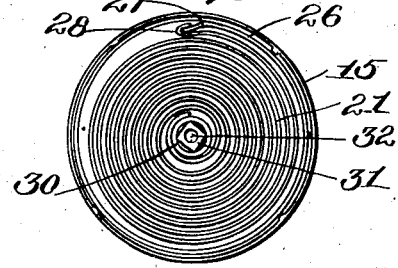
Figure 9:
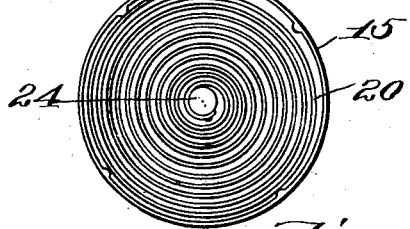
Figure 7:
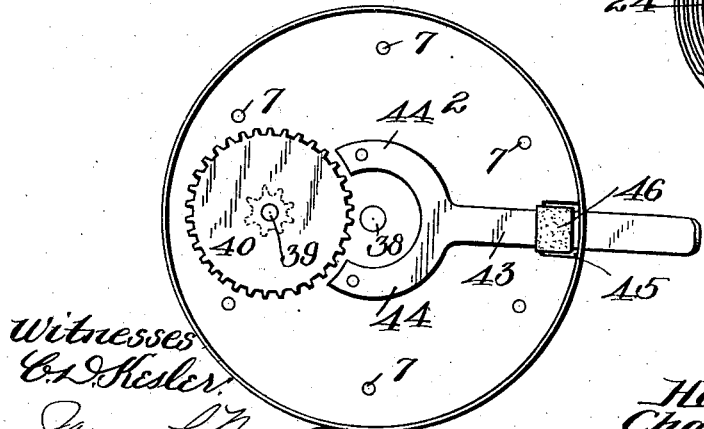
Figure 10:

Figure 1 is a top plan view of the reel. Fig. 2 is a bottom plan view of the same. Fig. 3 is a view in side elevation. Fig. 4 is an interior view of the winding-disk. Fig. 5 is a side view of one end of the casing, showing the ratchet thereon. Fig. 6 is a side view of the winding-drum, showing the fixed gear. Fig. 7 is an interior view of the outer plate of the casing, showing the brake and one of the gears mounted thereon. Fig. 8 is a view in side elevation of the spring-barrel, the outer plate being removed, showing one of the winding-springs. Fig. 9 is a sectional view of the same, showing the other winding-spring. Fig. 10 is a detail view showing one of the gears, and Fig. 11 is a central vertical sectional view of the complete reel.

Referring now to the drawings, 1 indicates the winding-drum, which is rotatably mounted in a manner hereinafter to be described in a casing comprising an outer plate 2 and an inner plate 3, the latter being provided with a series of integral posts 4, extending at right angles thereto, and at their ends being provided with a series of inward-extending projections 5, provided with screw-threaded apertures 6. The outer plate 2 is provided with a series of apertures 7, which are adapted to coincide with the apertures 6, and the two plates are secured together to form the casing by means of screws 8, passed through the aperture 7 and engaging in the apertures 6 of the posts. The winding-drum comprises a hollow cylindrical portion 9, secured to each end of which is a disk 10 11, respectively, which provide guards for retaining the line on the drum in the usual manner. The disk 10 is provided on its outer side at the center with a fixed gear-wheel 12, and said disk and gear-wheel are provided with an aperture 13. The disk 11 is also provided with a central aperture 14.

15 indicates a spring-barrel, which comprises a cylindrical portion 16, having two end plates 17 secured thereto in a manner to form a hollow receptacle, each of said plates being provided with a central aperture 18 19, respectively. In the spring-barrel 15 are arranged two springs 20 21, respectively, the spring 20 having one of its ends bent, as indicated at 22, and engaging in a slot 23, provided in the cylindrical portion 16 of the barrel, and its other end secured to an arbor having an outer end portion 25, provided with two flat sides for a purpose to be presently described. When in position, the arbor 24 projects outward through the aperture 18 in one of the end plates 17.

26 indicates a friction or drag spring, which is simply held within the drum by frictional contact with the wall of the cylindrical portion 16. One end of the drag-spring is slightly bent inward, as indicated at 27. The second spring 21 of the barrel is provided at its outer end with a catch 28, which is adapted to engage over the end 27 of the drag-spring 26. The inner end of the spring 21 of the barrel is secured to a winding-arbor 30, the inner end of which arbor is provided with a socket 29, which is adapted to receive the inner end of the arbor 24 when in position in the drum, while the outer end projects a suitable distance through the aperture 19 in the end plate 17 and is squared, as indicated at 31. An axially-bored screw-threaded aperture 32 is provided in the outer end of the arbor 30 for a purpose to be presently described.

It will thus be seen that the spring 20 positively engages the barrel 15 at one end, while the spring 21 has only a frictional engagement with the barrel through the intervention of the drag-spring 27. The two springs are separated by means of a disk 33, having a central aperture, through which the arbor 24 may pass.

In assembling the parts as thus far described one of the disks of the drum—say the disk 11—is removed, and the spring-barrel is inserted within the cylindrical portion 9, so that the arbor 24 will project through the aperture 13, a suitable washer 34 being interposed between the disk 10 and the end plate 17. The disk 11 is then secured to the cylindrical portion of the drum, so that the arbor 30 will project through the aperture 14. The two arbors 24 and 30 are thus loosely mounted or journaled in the end plates 17 of the barrel and in the disks 10 11 of the winding-drum. The inner plate 3 of the casing is provided on its outer side at the center with a fixed ratchet-wheel 35 and with a central aperture 36, extending through the plate and said ratchet. In order to place the winding-drum within the casing, the outer plate 2 being removed the posts 4 may be slightly bent outward and the winding-drum placed within the space surrounded by said posts and the winding-arbor 30 passed through the aperture 36, so that its outer squared end 31 will lie in a plane beyond the outer face of the ratchet 35, the remaining portion of the arbor being circular, so as to journal in the aperture 36. A suitable washer 37 is interposed between the disk 11 and the inner plate 3. The outer plate 2 is provided with a central aperture 38, and at a suitable point about midway between said aperture and the periphery of the plate is mounted therein a stub-shaft 39, on the inner end of which is fixed a large gear-wheel 40, adapted to lie substantially flush against the inner face of the plate 2. A small gear-wheel 41 is secured to the stub-shaft 39 on the outside of the plate 2 and is adapted to lie substantially flush against the outer face of said plate. The stub-shaft 39 has a portion 42 projecting beyond the small gear 41, the use of which will be presently described.

Mounted on the inside of the plate 2 is a brake 43, which is composed of a single bar of metal, having its inner end provided with two integral curved arms 44, which are adapted to encircle the aperture 38 and also the fixed gear 12 on the disk 10 when the outer plate is in position. The outer end portion of the brake projects through an opening 45. The curved arms 44 are secured, by means of rivets, to the outer plate, and the brake is bent in such manner as to normally press inward or away from the plate 2. Said brake may be wrapped with string or otherwise provided with a suitable substance to form an engaging surface to bear against the side of the winding-drum, as is customary, this friction material being indicated by 46. The outer plate 2 as thus constructed may now be placed over the posts 4 and secured in position as stated by means of the screws 8. When thus positioned, the large gear-wheel 40 will mesh with the fixed gear 12 on the winding-drum, the arbor 24 will project through the aperture 38 of said plate, and the brake 43 or the friction material 46 thereon will bear against the side of the disk 10 of the winding-drum. A washer 47 is interposed between the gear 12 and the inner side of the outer plate 2.

48 indicates a large gear-wheel which is provided with a non-circular aperture 49, adapted to receive the non-circular end portion 25 of the arbor 24 on which it is inserted, and when so inserted said gear-wheel 48 will mesh with the small gear 41 on the stub-shaft 39.

50 indicates a cup-shaped cap-plate which is provided on its outer side with the usual bar or plate 51, having projecting ends 52, by means of which the reel as a whole may be detachably secured to the rod. Extending through the cap-plate and the plate 50 is a central aperture 53, and near the periphery of the cap-plate is provided a similar aperture 54. The cap-plate 50 is provided at opposite sides with a flanged extension 55, each of which is provided with two apertures 56. The outer plate 2 of the casing is provided near opposite sides with two screw-threaded studs 57, over which the apertures 56 in the flanged extension 55 are adapted to pass. The cap-plate 50 is adapted to cover the gears 41 and 48, and when in position on the outer plate 2 the aperture 53 will rotatably receive the arbor 24, while the aperture 54 will receive the projecting portion 42 of the stub-shaft 39, thus centering said stub-shaft and preventing binding of the gears. The cap-plate is secured in position by means of nuts screwed on the studs 57. The washer 58 is interposed between the outer side of the plate 2 and the gear-wheel 48, and a similar washer 59 is interposed between said gear and the inner side of the cap-plate 50.

60 indicates the winding-disk, which, as shown, is provided with a milled periphery 61 to aid in turning it. Pivotally mounted on the inner side of the winding-disk is a pawl 62, which is normally pressed inward by means of a spring 63 to a position in which it will engage the teeth on the ratchet 35. The pawl 62 is provided with a tongue 64, which in the normal position of the pawl extends across an aperture 65 in the winding-disk and is engaged on its inner side by means of a finger 66, carried by a cup-shaped disk 67 and projecting through said aperture. The disk 67 is provided with an integral projection 68, by means of which it is pivotally secured to the outer side of the winding-disk through the medium of a suitable rivet. On the outer face of the winding-disk are provided two adjacent indentations 69 70, respectively, and the disk is provided with a lug 71, which is adapted to be received into one or the other of these indentations. In moving the disk to one side or the other a slight distance, so that the finger 66 will engage the tongue 64 and move the pawl 62 outward or will be moved away from said tongue to permit the pawl to spring inward and engage the teeth of the ratchet 35, the lug 71 will be lifted out of one indentation and passing over the intervening projection formed by the metal of the disk will spring into the other indentation. The winding-disk 60 is provided in its center with a squared aperture 72, which is adapted to receive the squared end 31 of the winding-arbor 30. The disk 67 is provided with an enlarged circular aperture 73, encircling the squared aperture 72, and through this aperture a screw 74 may be passed, the shank of which is adapted to be secured into the screw-threaded aperture 32 in the winding-arbor 30 and its head to engage the outer face of the winding-disk, whereby the latter is held in position on the winding-arbor. The aperture 73 is larger than the head of the screw 74, so that said head may pass through the same and lie in a plane below that of the top of the disk 67, so that said disk may move over the screw 74 in releasing or moving the pawl 62. The disk 67 is caused to lie above said screw by means of its cup shape.

The operation of the device is as follows: To wind the springs, the disk 60 is turned to rotate the winding-arbor 30, and thereby wind the spring 21. In this operation the drum being loosely mounted will be turned a greater or less extent with said spring, and as said drum engages the outer end of the spring 20 it will operate to wind said spring, its arbor 24 being held from rotation by means of the engagement of the large gear 48 with the gear 41 and of the large gear 40 with the fixed gear 12 on the winding-drum, said winding-drum being prevented from rotation by the pressure of the brake 43, and the winding proceeds until the springs have been partially or completely wound. Should the springs be wound too tight, either the brake-spring 27 will slip around the barrel or the pressure exerted will overcome the resistance of the brake to the turning of the drum, and the latter would then turn with the winding-disk. The springs may be also wound, as will be understood, by the unwinding of the line from the winding-drum, and should the springs be wound too tight in this manner they will be prevented from breaking by either one of the two operations above described. In winding the springs by the disk the pawl 62 will slide over the teeth of the ratchet 35, and the springs are prevented from unwinding by the engagement of said pawl with the teeth of said ratchet. Consequently if it be desired to free the winding-drum from the action of the springs it is only necessary to throw the pawl out of engagement with the ratchet, as above explained, when the springs will unwind, the arbor 30 causing the winding-disk 60 to revolve, and this continues until the springs have completely unwound. The winding-drum will now turn freely within the casing on the arbors 24 and 30 as journals, when the brake is removed from contact with the drum. The power from the springs to revolve the reel is exerted from the spring 21 to the brake-spring 27, to the spring-barrel 15, from said spring-barrel to the spring 20, and thence to the arbor 24, from the arbor 24 to the large gear-wheel 48, thence to the small gear 41 and the large gear 40, and thence to the gear 12, fixed on the disk 10 of the winding-drum. In winding the disk by paying out the line wound on the drum the springs will be wound by the same elements operating in the reverse order to that above given.

By the employment of two springs arranged as described we not only gain the increased power and greater range of action, but we provide for a gradual increase in tension on the winding-drum due to the yielding resistance of one spring exerted upon the other in the winding operation. The disk 67 forms a convenient means for disengaging the drum from operative connection with the springs, so that the reel may be used for "free casting." The brake mechanism described is very simple in construction, comprising, as it does, a single member.

Having thus fully described our invention, what we claim as new, and desire to secure by Letters Patent, is—

1. In a reel, a winding-drum, a barrel loosely mounted in said drum, a pair of springs arranged in said barrel and coiled in opposite directions, each of said springs having its outer end operatively connected to said drum, one of said connections being positive and the other frictional, an arbor connected to the other end of each spring and projecting through the sides of said barrel, gearing connecting one of said arbors with said drum, a casing inclosing said drum, and means exterior to the casing for turning the other arbor to wind said springs.

2. In a reel, a winding-drum, a case inclosing the same, a spring-controlled barrel loosely mounted in said drum and having arbors connected to the spring mechanism thereof and projecting through opposite sides of said drum and through opposite sides of said casing, gearing connecting one of said arbors with said drum, a winding-disk mounted on the other arbor, a ratchet mounted on the casing, and a pawl carried by said winding-disk and engaging said ratchet.

3. In a reel, a winding-drum, a case inclosing the same, a spring-controlled barrel loosely mounted in said drum and having arbors connected to the spring mechanism thereof and projecting through opposite sides of said drum and through opposite sides of said casing, gearing connecting one of said arbors with said drum, a winding-disk mounted on the other arbor, a ratchet mounted on the casing, a pawl carried by said winding-disk and adapted to engage said ratchet, and means mounted on the outer side of said winding-disk for moving said pawl out of engagement with said ratchet.

4. In a reel, a winding-drum, a case inclosing the same, a spring-controlled barrel loosely mounted in said drum and having arbors connected to the spring mechanism thereof and projecting through opposite sides of said drum and through opposite sides of said casing, gearing connecting one of said arbors with said drum, a winding-disk mounted on the other arbor, a ratchet mounted on the casing, a pawl carried by said winding-disk and adapted to engage said ratchet, a pivoted member mounted on the outer side of said winding-disk and having a finger projecting through an aperture therein and engaging said pawl whereby upon the movement of said member in one direction or the other said finger will move the pawl out of engagement with said ratchet, or release the pawl and permit it to engage said ratchet.

5. In a reel, a winding-drum, a case inclosing the same, a spring-controlled barrel loosely mounted in said drum and having arbors connected to the spring mechanism thereof and projecting through opposite sides of said drum and through opposite sides of said casing, gearing connecting one of said arbors with said drum, a winding-disk mounted on the other arbor, a ratchet mounted on the casing, a pawl carried by said winding-disk and adapted to engage said ratchet, a pivoted member mounted on the outer side of said winding-disk and having means for engaging said pawl for moving it out of engagement with said ratchet or for releasing the pawl to permit it to engage said ratchet, a pair of indentations in the outer face of the winding-disk, and a lug on said member adapted to spring into one or the other of said indentations in the movement of the pivoted disk.

6. In a reel, a winding-drum, a spring-controlled barrel loosely mounted in said drum and having arbors connected to the spring mechanism thereof and projecting through its opposite sides and through opposite sides of said drum, a gear fixed on the outer face of said drum, a casing inclosing said drum, a shaft journaled in said casing and having fixed on its inner end a gear-wheel in mesh with said fixed gear and outside of the casing with another gear, a gear-wheel mounted on one of said arbors to turn therewith and mesh with the outer gear of said shaft, controllable means exterior to the casing for turning the other arbor to place the spring-barrel under tension, and a brake for holding the drum against rotation.

7. In a reel, a winding-drum, a spring-barrel, arbors projecting from opposite sides of said barrel and journaled in said drum, one of said arbors being loosely mounted in said barrel and secured to the spring thereof, and the opposite arbor being operatively connected with said barrel, gearing connecting said opposite arbor with said drum, a winding-disk mounted on said first-mentioned arbor, a casing inclosing said drum, and movable means carried by said winding-disk and engaging a fixed part of said casing and adapted to be detached from such engagement to allow the drum to revolve independently of the action of the spring.

8. A reel-casing comprising a disk having a series of posts provided at intervals around its periphery and extending at right angles thereto, and provided at their outer ends with inward-extending projections having screw-threaded apertures, and a second disk mounted on the outer ends of said posts and having apertures coinciding with the apertures therein and adapted to be secured to said posts by means of screws passed through the apertures in said disk and engaging in the screw-threaded apertures of said posts.

In testimony whereof we have hereunto set our hands in presence of two subscribing witnesses.

HARVEY B. CARLTON.
CHAS. E. HUTCHINGS.

Witnesses:
MYRON T. BLY,
ALEX. E. MEEZIE.